United States Patent [19]

Giovannoni et al.

[11] Patent Number: 4,699,857

[45] Date of Patent: Oct. 13, 1987

[54] BATTERY SEPARATOR

[75] Inventors: Richard T. Giovannoni, Columbia, Md.; James K. J. Kung, Lexington; Wai M. Choi, W. Newton, both of Mass.

[73] Assignee: W. R. Grace & Co., New York, N.Y.

[21] Appl. No.: 919,109

[22] Filed: Oct. 15, 1986

[51] Int. Cl.⁴ ............................................. H01M 2/16
[52] U.S. Cl. ................................... 429/204; 429/206; 429/252; 429/254
[58] Field of Search ............... 429/254, 206, 204, 251, 429/252

[56] References Cited

U.S. PATENT DOCUMENTS

| | | |
|---|---|---|
| 3,298,869 | 8/1961 | Swoboda . |
| 3,351,495 | 11/1967 | Larsen et al. . |
| 3,419,431 | 12/1968 | Michaels et al. . |
| 3,558,764 | 6/1969 | Isaacson et al. . |
| 3,679,538 | 7/1972 | Druin et al. . |
| 3,843,761 | 10/1974 | Bierenbaum et al. . |
| 3,853,601 | 12/1974 | Taskier . |
| 3,880,672 | 4/1975 | Megahed et al. . |
| 4,024,213 | 5/1977 | Honda et al. . |
| 4,024,323 | 5/1977 | Verteegh ............................ 429/254 |
| 4,060,673 | 11/1977 | Dey . |
| 4,100,238 | 7/1978 | Shinomura ......................... 429/254 |
| 4,172,183 | 10/1979 | Ruetschi . |
| 4,190,707 | 2/1980 | Doi et al. . |
| 4,201,838 | 5/1980 | Goldberg . |
| 4,210,709 | 7/1980 | Doi et al. ............................ 429/254 |
| 4,285,751 | 8/1981 | Feinberg et al. ................... 429/254 |
| 4,287,276 | 9/1981 | Lundquist, Jr. et al. . |
| 4,327,164 | 4/1982 | Feinberg et al. ................... 429/254 |
| 4,331,746 | 5/1982 | Sheibley ............................. 429/254 |
| 4,361,632 | 11/1982 | Weber et al. . |
| 4,613,533 | 9/1986 | Loomis et al. . |

Primary Examiner—Donald L. Walton
Attorney, Agent, or Firm—Howard J. Troffkin

[57] ABSTRACT

A battery separator in the form of a microporous membrane composed of a substantially uniform composition of a polymer mixture of ultra high molecular weight polyolefin, polyethylene terpolymer and polyvinyl chloride, in combination with at least one plasticizer for the polymer mixture and an inert filler.

25 Claims, No Drawings

BATTERY SEPARATOR

BACKGROUND OF THE INVENTION

The instant invention is directed to an improved battery separator which exhibits very high degree of stability with respect to the conditions encountered in a battery system. In particular, the instant separator exhibits prolonged resistance to oxidative degradation. The present separator aids in providing a battery system capable of exhibiting extended activity.

Storage batteries are generally composed of at least one pair of electrodes of opposite polarity and an electrolyte. The battery may employ an acid or an alkaline electrolyte. Conventional acid batteries are exemplified by the lead-acid (sulfuric acid) batteries used in automobiles and the like. Alkaline batteries include secondary batteries such as nickel-zinc, nickel-cadmium, mercury-zinc and the like.

In addition to the electrodes and electrolyte, one of the recognized key components in a battery is the separator. Separators are elements located between electrodes to prevent direct contact between plates of opposite polarity while freely permitting electrolytic conduction. The separator must be porous to permit the electrolyte to be the sole internal conducting path between electrodes. Thus, although the separator itself must be substantially non-conducting, it must be capable of exhibiting low resistivity when in a battery system.

The separator is preferably in the form of a diaphragm or envelope (in which an electrode of at least one polarity is encased) which is microporous and has a high void volume. Such configurations permit the necessary free flow of electrolytic conductivity (low resistivity) while inhibiting active materials from passing through the separator causing unwanted bridging of plates of opposite polarity. Such contact may be due to imperfections in the plate structure or due to dendrite growth on the electrode during use or the like.

In addition to the above requirements the separator must be capable of being formed into a very thin sheet which is substantially inert to the environment established by the battery system. For example, it is well known that the battery forms an oxidative environment which causes degradation of materials used in forming conventional separators which, in turn, causes disintegration of the thin separator membrane. The ability to produce a separator membrane which is capable of withstanding the oxidative forces of the battery environment while fulfilling the other criteria of being microporous, having a high void volume, having a very thin cross-section, being inert to the battery components, exhibiting low electrical resistivity, and exhibiting high resistivity to passage of active material is highly desired.

U.S. Pat. No. 3,351,495 discloses a battery separator having a relatively low pore size and satisfactory electrical resistance characteristics made from a high molecular weight polyolefin having an average molecular weight of at least 300,000, a standard load melt index of substantially zero, and a reduced viscosity of not less than 4. The separator is manufactured by extruding the high molecular weight polyolefin in admixture with an inert filler and a plasticizer and then extracting the plasticizer by the use of a suitable solvent.

U.S. Pat. No. 4,024,323 discloses a variation to the '495 battery separator. The composition contains small amounts of a copolymer formed from an olefin or mixture of olefins (e.g., ethylene, propylene) and an ethylenically unsaturated carboxylic acid (e.g., acrylic or methacrylic acid) to aid in processability.

U.S. Pat. No. 4,287,276 is directed to the formation of a battery separator specifically useful in alkaline battery systems. The polyolefin matrix is highly filled with a particular class of fillers to form a microporous sheet having enhanced resistance to dendrite formation.

While the above separators have shown good stability, they do not exhibit the desired prolonged stability against oxidative forces encountered in the modern day, extended life batteries. Thus, these separators are known to degrade and permit shorting over a period of time. Extending the life of the battery can be achieved by using the presently described separator.

SUMMARY OF THE INVENTION

The present invention is directed to an improved separator which exhibits a high degree of stability with respect to a battery environment, can be formed into thin sheets, exhibit a high degree of inhibition to passage of active material and exhibits a high degree of electrical conductivity.

The present separator is a microporous membrane composed of a substantially homogeneous composition of (a) a polymer mixture formed from a polyolefin having a weight average molecular weight of at least 3 million, a partially crosslinked ethylene terpolymer and a vinyl or vinylidene halide polymer; (b) an inert filler and (c) a plasticizer for at least one of the polymer components.

DESCRIPTION OF THE INVENTION

The battery separator of the present invention is in the form of a very thin membrane or sheet which is formed from a substantially homogeneous mixture of a polymer blend, an inert filler and a plasticizer. Each of the components is fully described hereinbelow.

A mixture of polymers is required to form the subject separator sheet product. The mixture must be formed using a polyolefin of ultra high molecular weight. The term "ultra-high molecular weight," as used herein and in the appended claims refers to polymers having a weight average molecular weight of at least about three million, preferably at least about four million, as determined according to ASTM D-4020 or DIN-53493. The polyolefin can be homopolymers of ethylene or of propylene or a mixture of the formed homopolymers or a copolymer of ethylene and propylene. These polymers can be formed from very pure monomer stock using a Natta type catalyst in manners known to those skilled in the art.

A second component of the polymer mixture is composed of a polymer blend formed from a polyethylene terpolymer and a vinyl or vinylidene halide polymer as fully described hereinbelow. The polyethylene terpolymer is formed from (1) ethylene with, (2) an ethylenically unsaturated organic monomer other than an unsaturated carboxylic acid such as acrylic acid, maleic acid, and the like, and (3) an ethylenically unsaturated carboxylic acid such as acrylic acid, maleic acid, and the like, carbon monoxide, or sulfur dioxide. Exemplary of the organic monomers (2) are those selected from the group consisting of esters of said unsaturated mono- or dicarboxylic acids, vinyl esters of saturated carboxylic acids where the acid group has 2–18 carbon atoms, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds. Preferred organic monomers include methyl acrylate, butyl acrylate and vinyl acetate. The melt index range for these terpolymers is from 0.1 to 1000 (ASTM D-1238), preferably from about 1 to 100. The preferred terpolymers are formed from ethylene, an ester and carbon monoxide or a carboxylic acid.

The ethylene terpolymers used to form the present composition should have sufficient comonomer copolymerized therein to aid in providing compatability with the vinyl and vinylidene halide polymers described below. Generally speaking, the ethylene content in these terpolymers should be 40 to 85 percent, the content of the second monomer should be from 1 to 60 percent and the third monomer content should be from 1 to 30 percent, all based on the terpolymer weight. The lack of compatability can be tested by forming a blend of the ethylene terpolymer and the vinyl or vinylidene polymer described below and observing if the blend is opaque, show stress whitening when stretched and lack of required recovery to be considered elastomeric. A more detailed discussion of the conpatability of these ethylene copolymers with vinyl and vinylidene halide polymers, as well as a discussion of the preparation of the copolymers can be found in *Polymer-Polymer Miscibility*, O. Olabisi, L. M. Robeson and M. T. Shaw, Academic Press, N.Y., N.Y., 1979, U.S. Pat. No. 3,684,778 and U.S. Pat. No. 3,780,140, all herein incorporated by reference.

The polymer blend further comprises a vinyl or vinylidene halide polymer including copolymers resulting from copolymerization with a comonomer selected from the group consisting of vinyl esters, acrylonitrile, acrylic esters, vinylidene chloride, vinyl chloride, esters of unsaturated carboxylic acids and vinyl ethers. The weight ratio of ethylene terpolymer to vinyl or vinylidene halide polymer should be 19:1 to 1:3 and, preferably, 4:1 to 2:3. The preferred polymers are chlorides such as homopolymers of polyvinyl chloride or polyvinylidene chloride. For example, polyvinyl chloride having an inherent viscosity of 0.30 to 1.4 (ASTM D-1243) is generally useful in the practice of the subject invention.

The blending of the ethylene terpolymer with the vinyl or vinylidene halide polymer is accomplished by any one of a number of conventional techniques, for example, in a Banbury mixer, two-roll mill or extruder. The blending can be done prior to mixing with the polyolefin or concurrently with the formation of the polymer mixture. Preferably, the blending of the terpolymer and vinyl or vinylidene halide polymer is done prior to forming the mixture. This blending is done at a temperature high enough to soften the polymers for adequate blending, but not so high as to degrade the vinyl or vinylidene halide polymer. Generally speaking, this blending temperature ranges from 140° to 200° C., and blending is carried out for a time sufficient to homogeneously blend the components.

The ethylene terpolymer in the compatible blend is partially crosslinked. This can be carried out using any one or more of the well known crosslinking techniques including electron beam irradiation, gamma irradiation and free radical curatives such as peroxides. The crosslinking of the ethylene copolymer according to this invention can be carried out before or concurrently with blending with the vinyl or vinylidene halide polymers, or after such blending when using radiation techniques to effectuate the crosslinking. If the ethylene terpolymer in the blend contains carbon monoxide, diamines such as methylene dianiline or p-phenylene diamine can be used to effectuate the desired crosslinking. If the ethylene terpolymer is ethylene/vinyl acetate/carbon monoxide, sulfur vulcanizing agents can be used as detailed in U.S. Pat. No. 4,172,939. For crosslinking ethylene terpolymers containing carboxylic acid functionalities, the formation of ionic crosslinks is suitable in the practice of the subject invention, and is achieved with various metal oxides or hydroxides such as ZnO and NaOH, or with organometallics such as chromium acetylacetone, as detailed in U.S. Pat. No. 4,304,887.

The term "partially crosslinked" refers to a degree of crosslinking of the polymers, in particular, the ethylene terpolymer of the blend. The term "partially crosslinked" of the polymer blend refers to blends which have a gel content of 5 to 90 percent, preferably 10 to 70 percent based on total polymer blend. To quantify the degree of crosslinking, the amount of insoluble, and hence crosslinked, polymer can be determined by soaking a sample of the polymer blend, after crosslinking, in tetrahydrofuran at 23° C. for 16 hours, isolating the insoluble portion and weighing and dried residue. If other components are present, such as polyolefin or filler, one must make suitable corrections based upon knowledge of the composition. For example, the weight of components soluble in tetrahydrofuran such as plasticizers are subtracted from the initial weight; and components insoluble in tetrahydrofuran, such as fillers, are subtracted from both the initial and final weight. The insoluble polymer recovered is reported as percent gel content. This procedure is based on a conventional procedure for quantifying degree of crosslinking as is more fully detailed in U.S. Pat. No. 3,203,937. The conditions under which this crosslinking is carried out, i.e., type and quantity of crosslinking agent, crosslinking time and temperature to arrive at a composition having a gel content within this operable range, can be determined empirically. When chemical crosslinking agents are utilized, it is preferable that they be substantially totally consumed during the crosslinking step. Further description of polymer blends suitable for use in forming the subject separator is made in U.S. Pat. No. 4,613,533, the teachings of which are incorporated herein by reference.

The mixture of polymers shall be composed of from at least 40 to 95 (preferably 60 to 95) weight percent polyolefin and from 60 to 5 (preferably 40 to 5) weight percent of the above described polymer blend.

In another embodiment of the subject invention, the polymer mixture can be composed of the above described ultra-high molecular weight polyolefin and the above described polyethylene terpolymer wherein the monomer (3) is selected from carbon monoxide or sulfur dioxide. The polymer mixture can be formed from at least 40 to 95 (preferably 60–95) weight percent polyolefin and from 60 to 5 (40–5) weight percent polyethylene terpolymer.

The plasticizer of the instant composition further improves the processability of the composition, i.e., lower the melt viscosity, or reduces the amount of power input which is required to compound and to fabricate the composition and aids in inducing porosity, as discussed hereinbelow. The microporous separator of the present invention is formed from an initial composition having a very high content of plasticizer therein, such as, at least about 30 vol. percent and preferably at least 50 vol. percent based on the initial composition.

The plasticizer can be soluble or insoluble in water. Representative of the water-insoluble plasticizers are organic esters, such as the sebacates, phthalates, stearates, adipates, and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; low molecular weight polymers such as polyisobutylene, polybutadiene, polystyrene, atactic polypropylene, ethylene-propylene rubber; ethylene-vinyl acetate copolymer, oxidized polyethylene, coumarone-indene resins and terpene resins; tall oil and linseed oil. Illustrative of the water-soluble plasticizers are ethylene glycol, polyethylene glycol, glycerol, and ethers and esters thereof; alkyl phosphates such as triethyl phosphate; polyvinyl alcohol, polyacrylic acid and polyvinyl pyrrolidone. The preferred plasticizers are selected from organic esters, including oligimers and hydrocarbon materials including petroleum oils.

There are a number of water-insoluble, normally solid plasticizers which are sufficiently inert to form a part of the battery separator. Typical examples of these plasticizers are low molecular weight polyisobutylene, polybutadiene, polystyrene, atactic polypropylene, ethylene-propylene rubber, and ethylene vinyl acetate copolymer. Generally, when this type of plasticizer is used, it can be included in the battery separator in an amount as high as 40 percent by volume of the resultant battery separator composition.

The term "plasticizer" as used herein and in the appended claims refers to a material or materials capable of interacting with at least one of the polymers, preferably at least the polyolefin, forming the polymer blend under conditions used to blend the components and to form the initial composition into a sheet material. The interaction of the plasticizer and polymer is such that the filled polymeric composition exhibits reduced viscosity to aid in forming a substantially uniform sheet product.

The term "sheet" or "membrane" as used in the subject application is intended to define a substantially planar material which is formed from the initially composed admixture both prior and subsequent to extraction of plasticizer therefrom. The sheet material should be preferably, a film which is less than about 20 mils thick and more preferably, less than 10 mils thick with from about 2 to 7 being most preferred. It has been found that the highly filled polymeric composition of the present invention can be readily formed into such thin sheet material by conventional techniques. Separators formed from the sheet can be used in their planar form between electrodes of opposite polarity or can be formed into other configurations, such as pocket or envelopes, of suitable size to encase an electrode and provide separation between electrode pairs.

Filler material is the major component of the subject separator. The filler is particulate material having a small particle size ranging from about 0.01 to about 100 microns in average diameter. Preferred filler average diameter is from about 0.01 to about 20. The filler can have a surface area of from about 30 to 950 m$^2$/gm. It is preferred that the surface area of the filler be high such as at least 100 m$^2$/g. In the application relating to alkaline separators, the preferred filler has a surface area of from about 100 to about 400 m$^2$/cc U.S. Pat. No. 4,287,276.

The filler component can be chosen from a wide variety of materials provided the filler is inert with respect to the battery components, such as the electrolyte composition, the electrodes and the like of the battery system in which the separator is contemplated for use. The filler component must also be substantially inert with respect to the other components of the subject separator including the polymers forming the polymer mixture, the plasticizer and the like. Finally, the filler component should not be electrically conductive nor electrochemically active with respect to the battery system. Fillers which meet the above criteria will depend on the type of battery system in which it will be employed (acid or alkaline), the particular components of the battery, etc., and can be readily ascertained by those skilled in this art. For example, the term "inert" would require that battery separators with alkali insoluble fillers should be used only in alkaline batteries, and acid insoluble fillers should be used only in acid batteries. If so used, the filler is not extracted by the battery electrolyte. Neutral fillers, or fillers that do not react with either acid or alkaline electrolytes, can of course be used with either acid or alkaline batteries.

Examples of material which are suitable as fillers in appropriate application include materials which are soluble or insoluble in water. Representative of the fillers which are substantially water insoluble and operable in the instant invention are carbon black, coal dust and graphite; metal oxides and hydroxides such as those of silicon, aluminum, calcium, magnesium, barium, titanium, iron, zinc, and tin; metal carbonates such as those of calcium and magnesium; minerals such as mica, montmorillonite, kaolinite, attapulgite, asbestos, talc, diatomaceous earth and vermiculite; synthetic and natural zeolites; portland cement; precipitated metal silicates such as calcium silicate and aluminum polysilicate; alumina silica gels; wood flour, wood fibers and bark products; glass particles including microbeads, hollow microspheres, flakes and fibers.

Illustrative of the water-soluble fillers operable in the present invention are inorganic salts such as the chlorides of sodium, potassium, and calcium, acetates such as those of sodium, potassium, calcium, copper and barium; sulfates such as those of sodium, potassium and calcium; phosphates such as those of sodium and potassium; nitrates such as those of sodium and potassium; carbonates such as those of sodium and potassium and sugar.

The preferred filler is silica when the formed separator is to be used in an acid battery system. When the separator is to be used in an alkaline battery, the preferred fillers are titania, alumina or calcium or magnesium hydroxide. Neutral fillers, that is those that do not react with either acid or alkaline electrolytes can be used in either system and include carbon black, graphite, coal dust and the like.

Although highly filled polymeric compositions have been previously used to form separators for battery systems, the resultant products have, in certain instances, not met acceptable minimum electrical resistance, have not provided sufficient current flow to occur via the electrolyte, and/or have not possessed acceptable tensile properties. In addition, known highly filled polymeric separators do not exhibit a high degree of stability, especially resistance to oxidative degradation. The presently formed separator unexpectedly achieves all of the above criteria and thus provides a separator which enhances the battery life.

In addition to the above required components the separator can contain effective amounts of wetting agents, stabilizers, processing aids and the like. For example, commercially available wetting agents include sodium alkyl benzene sulfonate, sodium lauryl sulfate dioctyl sodium sulfosuccinate, isooctyl phenyl polyethoxyethanol and the like; stabilizers include 4,4-thiobis(6-tert-butyl-m-cresol), 2,6-di(tert-butyl)-4-methylphenol and the like; processing aids include sodium stearate and the like.

The battery separator is formed by a process which comprises blending a composition comprising from about 5 to about 25 (preferably 5–20) weight percent of the polymer mixture, from about 25 to about 75 (preferably 35–70) weight percent filler components and from about 15 to about 80 (preferably 40–75) weight percent plasticizer, forming the composition into sheet form and then extracting from the sheet by means of a suitable solvent at least a portion of the plasticizer.

The composition of the resultant separator will depend upon the degree of extraction of the plasticizer. The plasticizer can be substantially completely removed, leaving a highly filled polymeric sheet product or, alternatively, can have 60 percent and, preferably, 75 percent of the plasticizer of the admixture removed. These products normally show good retention of physical properties, as well as good electrical stability. The extracted separator membrane normally has from about 7 to 50 percent of the polymer mixture about 50 to 93 percent filler, and from about 0 to 20 percent plasticizer. The more preferred separators comprise a mixture of from 10 to 25 percent polymer mixture, 60 to 90 percent filler, and from 2 to 15 percent plasticizer.

The process of forming the subject separator comprises blending the components described hereinabove to form a substantially uniform admixture thereof, forming the admixture into a sheet product and, subsequently, extracting from said sheet at least a portion of the plasticizer contained therein. In view of the amount of filler and ultra high molecular weight pololefin, it has been suprisingly found that the subject composition is capable of being blended into a uniform admixture using relatively low energy.

The procedure for extraction of the plasticizer from a sheet product is well known and is not meant to form a part of the present invention, per se. A single stage extraction can be used. The solvent or extraction conditions should be chosen so that the polymers and filler components are essentially insoluble. For example, when petroleum oil is to be extracted from the molded composition, the following solvents are suitable; chlorinated hydrocarbons, such as trichloroethylene, tetrachloroethane, carbon tetrachloride, methylene chloride, tetrachloroethane, etc; hydrocarbon solvents such as hexane, benzene, petroleum ether, toluene, cyclohexane, gasoline, etc. If polyethylene glycol is to be extracted, the extraction medium can be water, ethanol, methanol, acetone, aqueous or alcoholic sodium hydroxide, potassium hydroxide, and the like when alkali resistant fillers are used. Generally, acids such as hydrochloric acid can be used when the filler, such as silica, is acid resistant.

The extraction temperature can range anywhere from room temperature up to a temperature below (preferably at least 10° C. below) the melting or degradation temperature of the polymers used.

The time of the extraction will vary depending upon the temperature used and the nature of the plasticizer being extracted. For example, when a higher temperature is used, the extraction time for an oil of low viscosity may be only a few minutes, whereas if the extraction is performed at room temperature, the time requirement for a polymeric plasticizer can be in order of several hours. The final composition of the separator will depend upon the original composition and the degree of extraction of the plasticizer from the sheet product.

When the separator is to be provided with rib members (such as for use in an acid battery) these members can be formed from the same composition or from other polymeric compositions which are compatible with the present composition. For example, other polymer compositions can be filled, unfilled or foamed polyolefins, polyvinyl chloride and the like. Alternately, the separator sheet can be grooved or embossed to provide the channel members to permit egress of gaseous products from the battery system. Other similar modifications can be made in known manners. The instant process and composition produce microporous battery separators which exhibit low electrical resistance, readily permits electrical conductivity via the electrolyte, and possess excellent tensile properties to accommodate the various physical forces encountered in the battery during operation. In addition, the present separator exhibits a high degree of stability and lack of degradation to the various chemical and electrochemical forces encountered in the battery.

The following examples are given for illustrative purposes only and are not meant to be a limitation on the claims appended hereto. All parts and percentages are by weight unless otherwise indicated.

EXAMPLE I 9.9 parts of a commercially available polyethylene having a weight average molecular weight of 5,000,000 and a density of 0.96 was mixed with 4.3 parts of a previously made blend of partially crosslinked polyethylene terpolymer (ethrylene/vinyl acetate/CO) and polyvinyl chloride (Alcryn—80A of Dupont having a Shore A Hardness of 78 and a density of 1.25; 27.5 parts of finely divided silica (HiSil 233) having an average particle diameter of 0.06 micron, a surface area of 165 $m^2/gm$ and a density of 2.2; and 66.3 parts of hydrocarbon oil (Sunthene 255; density of 0.89 g/cc, 54 suu at 210° F., flash point of 390° F.) were blended in a dry atmosphere using a high shear mixer with twin roller style mixing rotors. The blending was continued for thirty minutes while maintaining the mix at 175° C. The torque required was measured to be 750 gram·meters.

The compounded composition was pressed into sheets of approximately 10 mils thickness using a hydraulic press with heated plates (150° C.) at a pressure of 3000 psi. The formed sheets were observed to be a cohesive flexible material which was suitable for further handling and processing. The sheets were immersed in a bath of hexane maintained at ambient temperature for 15 minutes to extract out the petroleum oil and then dried. The extracted materials were microporous sheets having cross-sectional thickness of 10 mils and a void volume of about 73 volume percent. The highly filled sheets were composed of 34.2 percent polymer and 65.8 percent silica.

The sheets were analyzed for electrical resistivity according to the procedure described by J. J. Lander and R. D. Weaver in Chapter 6a entitled "Electrical Resistance Direct Current Method" Page 53-68 contained in "Characteristics of Separators, Screening Methods" ed. by J. E. Cooper and A. Fleischer except that the electrolyte was a 35 weight percent $H_2SO_4$ aqueous solution. Further, the samples were analyzed to determine their capacity to resist oxidative degradation as would occur in a battery environment by an accelerated oxidative degradation test performed by immersing the samples for a short period in an aqueous 30% isopropyl alcohol solution to insure wettability of the samples and then immersing the samples in a strong lead-(IV) oxidant solution formed by dissolving 50 parts by wt. of lead dioxide in 660 parts of 1 molar hydrochloric acid. Preformed tensile samples were immersed in the lead oxidant solution and removed after three, seven and ten day periods and tested for modification to its physical properties (tensile tests done according to ASTM D-412). Degradation is observed by the degree of decrease in elongation failure and increase in modulus. The results of the tests are given in Table I

TABLE I

| Number of Days | Electrical Resistance (m ohm in$^2$) | Tensile Modulus (lb/in$^2$) | Elongation Percent at Failure | Percent Retention of Orig. Elongation |
|---|---|---|---|---|
| 0 | 8.27 | 6,560 | 1,080 | — |
| 3 | — | 6,840 | 882 | 82 |
| 7 | — | 8,290 | 833 | 77 |
| 10 | — | 9,640 | 444 | 41 |

The sample exhibited low electrical resistance (thus showing excellent ability to provide free conductivity by the electrolyte) and good physical properties over the entire test period (thus showing that such material would exhibit a high degree of stability over extended periods while subjected to a conventional battery environ.

EXAMPLE II

A separator membrane was formed in the same manner as described in Example I above except that 6.6 parts (6.9 vol. percent) of polyethylene of 5,000,000 weight average molecular weight and 8.6 parts (6.9 vol. percent) of the polymer blend used in Example I above (Alcryn—80A) were used to form the composition. The torque required for mixing the composition was measured to be 100 gram · meters. The extracted sheet had a thickness of 10 mils. The sample was tested in the same manner as described in Example 1. The results are shown in Table II below.

TABLE II

| Number of Days | Electrical Resistance (m ohm · in$^2$) | Tensile Modulus (lb/in$^2$) | Elongation Percent at Failure | Percent Retention of Orig. Elongation |
|---|---|---|---|---|
| 0 | 7.27 | 3,300 | 789 | — |
| 3 | — | 3,350 | 600 | 76 |
| 7 | — | 4,030 | 512 | 64 |
| 10 | — | 4,960 | 122 | 15 |

Again the sample showed that it has good electrical resistance and maintained good physical properties after subjection to accelerated oxidation.

EXAMPLE III

For comparative purposes, samples were formed in a similar manner to that described in Example I using the same materials except that the compositions were formed from A) only polyethylene homopolymer of 5,000,000 molecular weight and B) only polyethylene homopolymer of 2,000,000 molecular weight (density of 0.96), as described in U.S. Pat. No. 3,351,495.

The samples were formed using 13.2 parts of polyethylene, 27.5 parts of silica, and 66.3 parts of hydrocarbon oil (Sunthene 255). The torque required to mix the composition was measured to be 1,500 gram · meters. Thus, it can be observed that the present composition, as illustrated in Examples I and II, require much less energy to form the desired homogeneous blend.

The samples were tested in the same manner as described above in Example I. The results are given in Table III below.

TABLE III

| Number of Days | Electrical Resistance (m Ω · in$^2$) | Tensile Modulus (lb/in$^2$) | Elongation Percent at Failure | Percent Retention of Orig. Elongation |
|---|---|---|---|---|
| SAMPLE A | | | | |
| 0 | 7.09 | 4,810 | 225 | — |
| 3 | — | 5,670 | 147 | 65 |
| 7 | — | 19,000 | 12.3 | 5 |
| 10 | — | 23,800 | 4.80 | 2 |
| SAMPLE B | | | | |
| 0 | 9.45 | 5,480 | 1,180 | — |
| 3 | — | 16,700 | 483 | 41 |
| 7 | — | 18,600 | 24.4 | 2 |
| 10 | — | 24,100 | 9.60 | 0.8 |

The above results show that although the samples are microporous and exhibit the desired low electrical resistance, they each severely deteriorate due to oxidation. In each case the material became brittle, would be easily damaged due to the forces exerted on a separator during use and would thereby permit shortening of the battery life.

EXAMPLE IV

For comparative purposes, samples were formed in the same manner as described in Example I except the polymer content was substituted by 6.6 parts (6.9 vol. percent of composition) of polyethylene of 2,000,000 molecular weight and 8.3 parts (6.9 vol. percent of composition) of polyvinyl chloride (Geon 121). The torque required to form the mixture was measured to be 1500 gram · meter. The sheet material was tested as described above in Example I. The results are given in Table IV below.

TABLE IV

| Number of Days | Electrical Resistance (m · in$^2$) | Tensile Modulus (lb/in$^2$) | Elongation Percent at Failure | Percent Retention of Orig. Elongation |
|---|---|---|---|---|
| 0 | 32.7 | 5,640 | 377 | — |
| 3 | — | 6,820 | 171 | 45 |
| 7 | — | 10,300 | 1.90 | 0.5 |
| 10 | — | 15,700 | 2.40 | 0.6 |

The above results shows that the formed microporous sheet exhibits high electrical resistance and poor oxidation stability.

What is claimed:

1. In a battery system composed of at least one pair of electrodes of opposite polarity, an electrolyte and a separator positioned between electrodes of opposite polarity, the improvement comprising that said separator is a microporous sheet composed of a substantially uniform composition of
   A. from 7 to 50 weight percent of a polymer mixture, said mixture formed from
      (a) from about 95 to about 40 weight percent of polyolefin formed from ethylene, propylene or mixtures thereof or a mixture of said polyolefins having a weight average molecular weight of at least about 3,000,000; and
      (b) from about 5 to about 60 weight percent of a polymeric blend formed from a polyethylene terpolymer and a vinyl or vinylidene halide polymer in a weight ratio of 19:1 to 1:3, said polyethylene terpolymer formed from (1) ethylene monomer, (2) at least one ethylenically unsaturated organic monomer selected from the group consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3–12 carbon atoms, and vinyl aromatic compounds, and, (3) an additional monomer selected from the group consisting of ethylenically unsaturated $C_3$–$C_{20}$ carboxylic acids, carbon monoxide, and sulfur dioxide;
   B. from 93 to 50 weight percent of a filler which is substantially inert with respect to the battery electrodes and electrolyte; and
   C. from 0 to 20 weight percent of plasticizer for at least one of said polymers of the composition.

2. The battery system of claim 1 wherein the polyolefin of the separator composition has a weight average molecular weight of at least about 4,000,000.

3. The battery system of claim 1 wherein the polyethylene terpolymer of the separator composition is composed of from 40 to 85 weight percent of (1), from 1 to 60 weight percent of (2) and from 1 to 30 weight percent of (3).

4. The battery system of claim 2 wherein the polyethylene terpolymer of the separator composition is composed of from 40 to 85 weight percent of (1), from 1 to 60 weight percent of (2) and from 1 to 30 weight percent of (3).

5. The battery system of claim 1 wherein the polymer mixture comprises partially crosslinked polyethylene terpolymer having a gel content of from 5 to 90 weight percent based of the total weight of the polymer mixture and said polyethylene terpolymer has a monomer residue content to cause said terpolymer to be compatible with the vinyl or vinylidene halide polymer.

6. The battery system of claim 2 wherein the polymer mixture comprises partially crosslinked polyethylene terpolymer having a gel content of from 5 to 90 weight percent based of the total weight of the polymer mixture and said polyethylene terpolymer has a monomer residue content to cause said terpolymer to be compatible with the vinyl or vinylidene halide polymer.

7. The battery system of claim 3 wherein the polymer mixture comprises partially crosslinked polyethylene terpolymer having a gel content of from 5 to 90 weight percent based of the total weight of the polymer mixture and said polyethylene terpolymer has a monomer residue content to cause said terpolymer to be compatible with the vinyl or vinylidene halide polymer.

8. The battery system of claim 1 wherein the polymer mixture (A) comprises from 95 to 60 weight percent of said polyolefin, and the plasticizer is selected from a hydrocarbon oil, or an organic ester, an organic ester oligomers and mixtures thereof.

9. The battery system of claim 2 wherein the polymer mixture (A) comprises from 95 to 60 weight percent of said polyolefin, and the plasticizer is selected from a hydrocarbon oil or an organic ester, organic ester oligomers and mixtures thereof.

10. The battery system of claim 3 wherein the polymer mixture (A) comprises from 95 to 60 weight percent of said polyolefin, and the plasticizer is selected from a hydrocarbon oil or an organic ester, organic ester oligomers and mixtures thereof.

11. The battery system of claim 5 wherein the polymer mixture (A) comprises from 95 to 60 weight percent of said polyolefin, and the plasticizer is selected from a hydrocarbon oil or an organic ester, organic ester oligomers and mixtures thereof.

12. The battery system of claim 1 wherein the battery is an acid battery and the filler is silica.

13. The battery system of claim 2 wherein the battery is an acid battery and the filler is silica.

14. The battery system of claim 3 wherein the battery is an acid battery and the filler is silica.

15. The battery system of claim 5 wherein the battery is an acid battery and the filler is silica.

16. The battery system of claim 1 wherein the battery is an alkaline battery and the filler is selected from titania, alumina, magnesium hydroxide, or calcium hydroxide.

17. The battery system of claim 2 wherein the battery is an alkaline battery and the filler is selected from titania, alumina, magnesium hydroxide, or calcium hydroxide.

18. The battery system of claim 3 wherein the battery is an alkaline battery and the filler is selected from titania, alumina, magnesium hydroxide, or calcium hydroxide.

19. The battery system of claim 5 wherein the battery is an alkaline battery and the filler is selected from titania, alumina, magnesium hydroxide, or calcium hydroxide.

20. In a battery system composed of at least one pair of electrodes of opposite polarity, an electrolyte and a separator positioned between electrodes of opposite polarity, the improvement comprising that said separator is a microporous sheet composed of a substantially uniform composition of
   A. from 7 to 50 weight percent of a polymer mixture, said mixture formed from
      (a) from about 95 to about 40 weight percent of polyolefin formed from ethylene, propylene or mixtures thereof or a mixture of said polyolefins having a weight average molecular weight of at least about 3,000,000; and
      (b) from about 5 to about 60 weight percent of a polyethylene terpolymer formed from (1) ethylene monomer, (2) at least one ethylenically unsaturated organic monomer selected from the group consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1–18 carbon atoms, vinyl or vinylidene halides, acrylonitrile, methacrylonitrile, norbornene, alpha-olefins of 3-12 carbon atoms, and vinyl aromatic compounds, and, (3) an additional monomer selected from the group consisting of carbon monoxide, and sulfur dioxide;

B. from 93 to 50 weight percent of a filler which is substantially inert with respect to the battery electrodes and electrolyte; and C. from 0 to 20 weight percent of plasticizer for at least one of said polymers of the composition.

21. The battery system of claim 20 wherein the polyethylene terpolymer of the separator composition is composed of from 40 to 85 weight percent of (1), from 1 to weight percent of (2) and from 1 to 30 weight percent 22. A separator sheet product comprising a microporous sheet having a thickness of less than about 20 mils composed of a substantially uniform composition of (A) from 7 to 50 weight percent of a polymer mixture, said mixture formed from (a) from about 95 to about 40 weight percent of polyolefin formed from ethylene, propylene or mixtures thereof or a mixture of said polyolefins having a weight average molecular weight of at least about 3,000,000; and (b) from about 5 to about 60 weight percent of polymeric blend formed from a polyethylene terpolymer and a vinyl or vinylidene halide polymer in a weight ratio of 19:1 to 1:3, said polyethylene terpolymer formed from (1) ethylene monomer, (2) at least one ethylenically unsaturated organic monomer selected from the group consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1-18 carbon atoms, vinyl or vinylidene halides, acrylonitrile, methacrylonitrile, norbornene, alpha olefins of 3-12 carbon atoms, and vinyl aromatic compounds, and, (3) an additional monomer selected form the group consisting of ethylenically unsaturated $C_3$–$C_{20}$ carboxylic acids, carbon monoxide, and sulfur dioxide;

B. from 93 to 50 weight percent of a filler which is substantially inert with respect to the battery electrodes and electrolyte; and C. from 0 to 20 weight percent of plasticizer for at least one of said polymers of the composition 23. The separator sheet of claim 22 wherein the polyethylene terpolymer is composed of from 40 to 85 weight percent (1), from 1 to 60 weight percent of (2), and from 1 to 30 weight percent of (3).

24. A separator sheet product comprising a microporous sheet having a thickness of less than about 20 mils composed of a substantially uniform composition of (A) from 7 to 50 weight percent of a polymer mixture, said mixture formed from (a) from about 95 to about 40 weight percent of polyolefin formed from ethylene, propylene or mixtures thereof or a mixture of said polyolefins having a weight average molecular weight of at least about 3,000,000; and (b) from about 5 to about 60 weight percent of a polyethylene terpolymer formed from (1) ethylene monomer, (2) at least one ethylenically unsaturated organic monomer selected from the group consisting of esters of unsaturated $C_3$–$C_{20}$ mono- or dicarboxylic acids, vinyl esters of saturated $C_2$–$C_{18}$ carboxylic acids, vinyl alkyl ethers wherein the alkyl group has 1-18 carbon atoms, vinyl or vinylidene halides, acrylonitrile, methacrylonitrile, norbornene, alpha olefins of 3-12 carbon atoms, and vinyl aromatic compounds, and, (3) an additional monomer selected form the group consisting of carbon monoxide, and sulfur dioxide;

B. from 93 to 50 weight percent of a filler which is substantially inert with respect to the battery electrodes and electrolyte; and C. from 0 to 20 weight percent of plasticizer for at least one of said polymers of the composition.

25. The separator sheet of claim 24 wherein the polyethylene terpolymer is composed of from 40 to 85 weight percent (1), from 1 to 60 weight percent of (2), and from 1 to 30 weight percent of (3).

* * * * *